(12) United States Patent
Staib et al.

(10) Patent No.: US 8,204,821 B2
(45) Date of Patent: Jun. 19, 2012

(54) SIMULATION AUCTION FOR PUBLIC OFFERING

(75) Inventors: William E. Staib, Coralville, IA (US); F. Burke Dempsey, Greenwich, CT (US)

(73) Assignee: Well Auctioned, LLC, Greenwich, CT (US)

(*) Notice: Subject to any disclaimer, the term of this patent is extended or adjusted under 35 U.S.C. 154(b) by 0 days.

(21) Appl. No.: 13/088,532

(22) Filed: Apr. 18, 2011

(65) Prior Publication Data
US 2011/0196780 A1 Aug. 11, 2011

Related U.S. Application Data

(63) Continuation of application No. 11/183,559, filed on Jul. 18, 2005, now abandoned.

(60) Provisional application No. 60/589,328, filed on Jul. 20, 2004.

(51) Int. Cl.
G06Q 40/00 (2012.01)
G06Q 30/00 (2012.01)

(52) U.S. Cl. ........ 705/37; 705/26.1; 705/26.3; 705/36 R

(58) Field of Classification Search ............. 705/14, 705/26, 35, 37
See application file for complete search history.

(56) References Cited

U.S. PATENT DOCUMENTS

| | | | |
|---|---|---|---|
| 5,835,896 A | 11/1998 | Fisher et al. | |
| 6,101,484 A | 8/2000 | Halbert et al. | |
| 6,243,691 B1 | 6/2001 | Fisher et al. | |
| 6,263,358 B1 | 7/2001 | Lee et al. | |
| 6,266,649 B1 | 7/2001 | Linden et al. | |
| 6,266,805 B1 | 7/2001 | Nwana et al. | |
| 6,269,343 B1 | 7/2001 | Pallakoff | |
| 6,285,989 B1 | 9/2001 | Shoham | |
| 6,314,555 B1 | 11/2001 | Ndumu et al. | |
| 6,317,727 B1 | 11/2001 | May | |
| 6,338,047 B1 | 1/2002 | Wallman | |
| 6,421,653 B1 | 7/2002 | May | |
| 6,516,303 B1 | 2/2003 | Wallman | |
| 6,578,014 B1 | 6/2003 | Murcko | |
| 6,601,044 B1 | 7/2003 | Wallman | |

(Continued)

FOREIGN PATENT DOCUMENTS

WO WO 2005033910 A2 * 4/2005

OTHER PUBLICATIONS

Michaely et al., "Conflict of Interest and the Credibility of Underwriter Analysis Recommendations", 1999, The Review of Financial Studies, vol. 12 No. 4, pp. 653-686.*

(Continued)

Primary Examiner — Narayanswamy Subramanian
Assistant Examiner — Ryan D Donlon
(74) Attorney, Agent, or Firm — Stuart R. Hemphill; Dorsey & Whitney LLP

(57) ABSTRACT

The invention provides a method and system to estimate demand, pricing, allocation and aftermarket demand for public offerings via a simulation auction using collaborative forecasting. The simulation auction incorporates features to enhance participant knowledge about a particular company and its proposed auction. The simulation auction may be used to collect information regarding likely or equilibrium pricing of actual offerings, as well as to generate demand curve provides for different types of participants (e.g. retail and institutional investors).

20 Claims, 6 Drawing Sheets

U.S. PATENT DOCUMENTS

| | | |
|---|---|---|
| 6,604,089 B1 | 8/2003 | Van Horn et al. |
| 6,606,608 B1 | 8/2003 | Bezos et al. |
| 6,606,615 B1 | 8/2003 | Jennings et al. |
| 6,609,112 B1 | 8/2003 | Boarman et al. |
| 6,629,082 B1 * | 9/2003 | Hambrecht et al. ........ 705/36 R |
| 6,631,356 B1 | 10/2003 | Van Horn et al. |
| 7,113,917 B2 | 9/2006 | Jacobi et al. |
| 7,177,838 B1 | 2/2007 | Ling |
| 7,296,033 B1 | 11/2007 | Lynch |
| 7,346,568 B1 | 3/2008 | Cadoux |
| 7,848,940 B1 * | 12/2010 | Harniman et al. ................. 705/5 |
| 7,991,624 B2 * | 8/2011 | Malone ......................... 705/1.1 |
| 2001/0039530 A1 | 11/2001 | Annunziata |
| 2002/0002509 A1 | 1/2002 | Wagorn et al. |
| 2002/0059135 A1 | 5/2002 | Ma et al. |
| 2002/0077890 A1 * | 6/2002 | LaPointe et al. ................ 705/14 |
| 2002/0128952 A1 | 9/2002 | Melkomian et al. |
| 2003/0014346 A1 * | 1/2003 | Zhang ............................. 705/37 |
| 2003/0078871 A1 | 4/2003 | Webb |
| 2003/0126068 A1 | 7/2003 | Hauk et al. |
| 2003/0172019 A1 | 9/2003 | Getty |
| 2003/0220773 A1 | 11/2003 | Haas et al. |
| 2004/0039685 A1 | 2/2004 | Hambrecht et al. |
| 2004/0064395 A1 | 4/2004 | Mintz et al. |
| 2004/0205015 A1 * | 10/2004 | DeLaCruz ...................... 705/37 |
| 2004/0243502 A1 | 12/2004 | Slowik et al. |
| 2004/0254876 A1 | 12/2004 | Coval et al. |
| 2004/0260641 A1 | 12/2004 | Cohen |
| 2005/0010520 A1 | 1/2005 | Dinwoodie |
| 2005/0080707 A1 * | 4/2005 | Glasspool ....................... 705/37 |
| 2005/0125330 A1 | 6/2005 | Dinwoodie |
| 2005/0125331 A1 | 6/2005 | Dinwoodie |
| 2005/0187851 A1 | 8/2005 | Sant |
| 2005/0203820 A1 | 9/2005 | Dweck et al. |
| 2005/0203824 A1 * | 9/2005 | Freud et al. ..................... 705/37 |
| 2006/0259399 A1 | 11/2006 | Mintz et al. |
| 2007/0207850 A1 | 9/2007 | Darrah et al. |
| 2008/0010141 A1 * | 1/2008 | Smith et al. ..................... 705/14 |
| 2008/0294544 A1 * | 11/2008 | Harrington et al. ............. 705/37 |
| 2009/0006299 A1 * | 1/2009 | Baum ............................. 706/46 |
| 2009/0292647 A1 * | 11/2009 | Porat et al. ...................... 705/80 |

OTHER PUBLICATIONS

Pillutla, Sharma, Investigation of the Impact of Decision Parameters for a Dutch Auction Simulation for IPO Issues, 2002, Developments in Business Simulation and Experiential Learning, vol. 29.*

Thavikulwat, Precha "Gaming Agency Markets", 2003 Developments in Business Simulation and Experiential Learning, vol. 30, pp. 225-230.*

Pillutla, Sharma. "Investigation of the Impact of Decision Parameters for a Dutch Auction Simulation for IPO Issues," *Developments in Business Simulation and Experiential Learning*, vol. 29, pp. 149-154 (2002).

Michaely, Roni. "Conflict of Interest and the Credibility of Underwriter Analyst Recommendations," *The Review of Financial Studies*, vol. 12, No. 4, pp. 653-686 (1999).

\* cited by examiner

Well Auctioned

Independent Research & Price Discovery Tools for IPOs 

Create a New Account

Name:
[_____] — 70

Email:
[_____] — 72

Password:
[_____]

Confirm Password:
[_____]

Qualification:

○ I am NOT professional investor — 74

○ I am a professional investor

NASD member:

○ Nor I, nor my immediate family members are employees or affiliated with a NASD member — 76

○ I and/or my immediate family member(s) are employees or affiliated with a NASD member Persons employed by, or associated with any NASD member firm may not participate in Auction Simulations. However you have full access to analytical reports, results of auction simulations and any other service provided by this site.

Register and Sign In Now

FIGURE 3

Well Auctioned
Independent Research & Price Discovery Tool

| Home | Featured IPO | Auction Simulation | Research Reports | Member Forum | Shop | Abou |

Quick Launch

Auction Simulation

Auction: [Google IPO Test#1 ▾]

This auction may continue until the start of Google's road show at which time all participants will be notified by e-mail.

Enter New Bid:

Your available credit: $10,000.00

Bid Amount: [_____] — 82

Share Price: [_____] — 84

Submit  Clear

Figure 5

SIMULATION AUCTION FOR PUBLIC OFFERING

CROSS-REFERENCE TO RELATED APPLICATION(S)

This application is a continuation of U.S. application Ser. No. 11/183,559, filed Jul. 18, 2005, which claims the benefit of U.S. Provisional application No. 60/589,328 entitled "SIMULATION AUCTION FOR PUBLIC OFFERING", filed on Jul. 20, 2004, the subject matters of both of which are hereby incorporated by reference herein in their entirety.

FIELD OF THE INVENTION

This invention relates generally to a method and system for simulating a public offering of securities. More specifically, the invention relates to a method and system to estimate demand, pricing, allocation and aftermarket demand for public offerings via a simulation auction of securities using collaborative forecasting.

BACKGROUND OF THE INVENTION

Price Discovery

Investment securities may be sold to institutions or to individuals and sold in public or private offerings. Companies with certain profiles can raise significant financing by public offerings. The amount of money raised depends on the unit price of the securities sold and the number of units sold. One example of a securities offering is an initial public offering (IPO). In an IPO there has been no prior public market for the securities that would establish a price-demand curve for the securities. This makes pricing of securities difficult in an IPO. However, also for other kinds of offerings, investors may be uncertain about an appropriate price offer, and the offering party may need information about demand and appropriate pricing.

Generally, the offeror selects a lead underwriter for the offering and that underwriter uses a variety of methods to develop information on possible demand for the securities, so that a price can be established. The underwriter must contact potential buyers and work with them to determine the price (if any) they are willing to pay for the to-be-offered securities. With sufficient firm bids in hand, the underwriter can then sell the securities, making allocation decisions as needed, if the bids exceed the amount of securities offered.

In public securities offerings, a lead underwriter (book-runner) manages and coordinates the entire process of a securities distribution and has sole access to an aggregated "book" of bids as well as the discretion to allocate securities to bona fide investors. There are several possible methods a book-runner can utilize to price and distribute securities; however, the "book-building" methods is that most frequently utilized with the "dutch auction" method being utilized on occasion. Both methods serve as a final means to collect, aggregate and calculate a final price and allocate shares. On rare occasions, a lottery is held by a specific underwriter during an oversubscribed transaction to allocate a portion of shares for retail/individual investors.

During the course of the securities registration period, the issuer (the company offering the stock) and the underwriters may mutually agree to change the proposed price range or amount offered in response to: (1) inferred market conditions' impact on potential demand and pricing; (2) feedback the lead manager receives from its syndicate's respective distribution network of salespeople and brokers; or (3) specific issuer demands or objectives.

The conventional price discovery methods have limitations affecting both investors and underwriters, for several reasons. The methods lack transparency. That is, investors have no opportunity to review the aggregated source bid data or the rationale upon which final pricing its based by the book-runner. Further, there are barriers inhibiting pricing feedback between the offering syndicate and the investing community, so that communication of pricing information is not truly real-time. The issuer and its bankers are traveling on a "roadshow," often globally, to meet potential investors, which can exacerbate timing lags in communication and decision making. During the course of the roadshow there are many layers of communications among the syndicate, their respective distribution networks, and potential investors, each of which can create a timing lag, as well as potential for miscommunication.

Another limitation on communication is created by SEC regulations. SEC regulations strictly limit the information a broker/dealer involved in a securities distribution may provide—the information is limited to the delivery of a prospectus. Thus, by law, underwriters may not show investors any other data, no matter how valuable the market might deem it, lest such information be deemed a prospectus subject to SEC review. Trying to provide the marketplace with additional information beyond a traditional prospectus creates an unworkable paradox because of the regulations placed on the broker/dealer community. Providing the data would require adjusting the prospectus, which would take time. During such time lag and as a result of data change, the market could change again. Thus, no market equilibrium is reached, and with multiple adjustments the final pricing could theoretically be delayed substantially. This can hurt the issuer, underwriter and the efficiency of the capital markets. Depending on the security and type of registration document that the issuer utilizes, SEC regulations may also require that if the total dollar amount raised based on the final pricing is increased or decreased by greater than 20% of the latest prospectus filing amount, the issuer must file an amended registration statement with the new amounts and wait 48 hours for effectiveness of such amended registration statement. Facing such a time delay forces underwriters and issuers to determine the costs and benefits of filing such an amendment.

One suggested alternative for developing pricing for an offering is to sell the securities in some form of open auction, where the public can submit bids. The shares can be allocated by rules stated to the bidders by the underwriter that manages the auction. Such a public auction is described in U.S. Pat. No. 6,629,082. That patent discusses allocation rules defined by economist William Vickrey.

Pricing and Allocation of Demand

The "book-build" and "dutch auction" processes have a similar underlying objective to aggregate and qualify all demand (excluding non bona fide or outlying bids) and create a clearing price. In both processes, the underwriters canvass demand of investors via a roadshow, placing primary emphasis on large institutional buyers who have the experience and resources to evaluate a company and determine valuation for securities of an issuer. The two methods vary, however, in their determination of what constitutes the clearing price and in allocation of demand.

In the "book-build" process, underwriters receive indications of interest that are forwarded to the book-runner, who compiles a list of bona fide potential investors, the security amounts they desire and price level or limitations. The bookrunner generally has total discretion to allocate shares and to move the price within the allowable range. Once satisfied with the process, the book-runner proposes to the Issuer final prices and terms, as well as a "book" of investors recommended to receive an allocation. Typically there is room for the issuer to negotiate several items such as price and preferred investors. Once an underwriting agreement is executed, the orders from investors are confirmed (investors may also cancel their order up to this time for any reason including if the terms, conditions, or price have been varied as a result of negotiations between the book-runner and issuer).

Inherent in the book-build process is an estimation of the discount (if any) required to attract investors to a new issuer (versus other similar public comparables). This discount then forms the basis for the so-called aftermarket "pop," or value increase A "pop" enables the transaction to be perceived as a success in the investment community, compensates investors (mostly institutional) for taking a risk on a new issuance of a security, and reduces the odds that the underwriters will be left holding the security. This could happen if investors failed to pay for their allocation, because the security traded immediately below its issue price. Alternatively, a disproportionately large "pop" often means there was large unfilled demand. Such underpricing may deprive the issuer of useful incremental capital. Instead such profits flow to the secondary markets (for example, investors and traders).

In the "dutch auction" process, bidders are qualified by the lead manager to participate and receive a bidder identification number. When the bidding period opens, investors may submit one or more bids of varying amounts. Bids may be modified while the auction is open; however, they become final at a specific timeframe, and the transaction is priced. To determine a clearing price, bids are aggregated by price from highest to lowest, and by summing shares bid until the supply (the number of shares the company desires to sell) is met. The dutch auction manager reserves the right to eliminate bids it considers manipulative (excessively high or large bids). The price per share of the lowest bid that fulfills the supply available is the price that all investors in a dutch auction IPO receive on their investment. The dutch auction considers the individual's bid equally alongside an institutional bid without regard to number of shares bid.

Challenges of Historical Price Discovery and Allocation Process:

The Book Build Process

The book-build and, more recently, the dutch auction processes have successfully matched trillions of capital of investors to issuers over the history of the public U.S. capital markets. The depth and fluidity of U.S. capital markets exceed any other in the world; however, recent regulatory action against, and large financial settlements by numerous broker/dealers with regard to underwriter research, IPO pricing, securities allocation, and aftermarket trading commissions provides the moment to consider novel approaches for the U.S. to further improve its capital markets.

These regulatory actions sought to inject more transparency into price discovery and greater allocation fairness into the capital raising systems. A reason for the lack of transparency lies in the price discovery and allocation process resting solely with the book-runner. The book-runner must mitigate the risk of conflicts of interest inherent in having two clients, one on each side of the transaction, i.e., the investor and broker/salesperson v. the issuer and the corporate finance banker. In addition, the book-runner has obligations to its own representatives.

The book-build process has inherent limitations. For price discovery, the book-build process is dependent on human interaction between the book-runner's distribution network and syndicate and the investment community. As a result, it is subject to time-lags, miscommunication and disinformation.

Time-lags occur, because the entire distribution system and syndicate must canvass demand, primarily in the oral format, and then take the time to convert the raw data into useful computer-based analytical materials. Time-lags and inefficiency of information collection also arise because the syndicate suffers the same vagaries of human interaction that exist in a typical vendor/customer relationship. A given salesperson/broker may not have a strong enough relationship with his/her customer to elicit timely feedback, or may decline to make further follow-up calls requested by the book-runner on any specific securities transaction in the short-term, for fear of upsetting the long-term customer relationship.

Miscommunication can result from simple verbal or body language miscues, interpretive mistakes in converting oral instructions to written, or a misunderstanding by the broker/salesperson or customer of the issuer or its proposed transaction terms and conditions. Such miscommunications increase the risk of erroneous data being factored into the pricing.

Disinformation results from investor tactics employed to offset the asymmetric information balance between any one investor and the book-runner, who is the only entity with full access to all investor bids and the Issuer's objectives. The largest investors are heavily courted during a securities transaction as a result of their collective buying power and knowledge of securities valuation. As a result, they know their inputs are valuable to the book-runner as well as to other potential investors. The buyer's desire for the lowest possible price for the investment can result in disinformation tactics in the early stages of a securities transaction. Customers often worry that conveying or "exposing" their true bid price level (and knowledge) early to a broker/salesperson may result in higher pricing, and/or could be shared with other customers during the canvassing of demand (as a result of the oral-based nature of the book-build process). These tactics often lead to a rush of bids and price changes at the end of the process—such a change in price or demand can catch a book-runner unprepared. If the change is large enough, the issuer may need to file an amendment to its registration statement to capture the increase in demand or pricing (also creating a time-lag), or accept that such unfulfilled demand and price flexibility from customers will result in potentially lower proceeds than justified and an excessive aftermarket "pop."

Another limitation of the book-build process lies in allocations. The book-runner has sole discretion to accept orders and to allocate shares (though generally the book-runner takes issuer preferences into account to the degree that a reasonable transaction may still be executed). The book-runner often prioritizes and maximizes allocations to customers who are considered knowledgeable about the issuer's sector and who have a history of maintaining reasonable holding periods for securities purchases via a new issue (i.e., they are not short-term "flippers" who immediately, or a short time thereafter, trade a security back to the syndicate to collect a profit or limit a loss). An investor desires to obtain an allocation reflective of its view on that issuer's sector and commensurate with the customer's overall portfolio size.

Other general securities underwriting challenges include allocation issues where it is frequently difficult for a small investor to obtain shares of a "hot" issue, and pricing quandaries based on the tradition that the underwriting process is a closed process where only the underwriters know the demand price and overall interest level in a given offer (i.e. asymmetric information) and there is no real-time feedback to investors about their bid price or potential allocation before the auction closes, which permit them to refine their bid to the benefit of all parties.

The Dutch Auction Process

Offering processes, such as "Open IPO" processes, where the offering price is determined via a "dutch auction" methodology have recently been introduced (See U.S. Pat. No. 6,629,082 mentioned above.). In such process, the price at which the company sells shares to the public is based upon actual bids from institutional and individual retail investors. The offering price is determined by sorting all of the bids from high price per share to low price per share, and summing shares bid until the supply (the number of shares the company desires to sell) is met. The price per share of that bid that fulfills the supply available is the price that all investors in a dutch auction securities offering receive to make their investment. This approach improves price discovery relative to the book-build process and places institutions and retail investors on more equal footing.

The offerings built on the dutch auction process have several limitations. While more fair and democratic to a broader spectrum of investors than a book-build offering in the sense that those at or above the clearing price receive allocations irrespective of their investment "pedigree", the open offering process is not necessarily more "open" or transparent to all participants. Firstly, the underwriters may choose to prohibit participation of certain parties based on their own review and qualification criteria so it is not truly open to all bidders. Secondarily, because the bids for an open offering are only known to the underwriters (again the asymmetric information quandary), it is impossible for bidders or potential bidders to know whether their bid is likely high enough to purchase shares until after the auction process is completed, thus there is no more transparency in a dutch auction than a book-build. Experience with dutch auctions for securities underwriting has shown that there may be completely different demand curves for retail and institutional investors. For example, in an IPO, retail investors may get caught up in the frenzy of an IPO and overbid for the offering.

While there is some protection from overbidding—if an investor bids $100 per share and the security is priced at $20 per share, all investors are charged $20 per share—this protection is not absolute. If many investors bid irrational prices in an attempt to guarantee participation in an offering, the result may be artificially to drive up the price of the offering beyond the true market price (commonly known as the "winner's curse"). Thus, all investors may lose money if the price subsequently drops. Further, in some dutch auction securities offerings, underwriters have the right to disqualify bids that are deemed to be "manipulative" by the underwriters. The rules to determine what constitutes "manipulative" are typically not defined to the public and an investor bidding too high may find itself disqualified from the offering.

There is no mechanism for participants in advance to review the demand curve of the open offering to determine whether their bid level is likely to be viewed as manipulative. For example, a participant might want to know that their bid is more than a certain amount higher (for example 3 standard deviations) than the mean bid and thus likely to be discarded.

There is also no mechanism for participants in a dutch auction securities offering to understand the effect on their bid if the underwriter decides to lower the offering price to a level below what the statistics of the securities offering would otherwise indicate (e.g., will the underwriters price the securities at 5%, 10%, or 20% below the auction-based price level). There are issues for institutional investors with regard to maintaining an optimal investment position size for any given issuer in their portfolio. Thus if the institutional investor were to receive too small of an allocation due to a unilateral clearing price reduction by the underwriter and/or issuer, the institutional investor would either need to purchase more shares in the aftermarket or would consider "flipping" their sub-optimal sized allocation back to the syndicate—creating an unattractive dilemma for either underwriter or investor.

Further, conflicts of interest arise among underwriters with retail distribution networks (i.e. individual investors) in a dutch auction securities offering. There is difficulty in determining how to protect the privacy of a broker's accounts while qualifying such retail investors. The traditional book-build process for retail distribution is opaque from each underwriter's point-of-view, as the specific retail customers' identities are kept confidential from any other broker/dealer involved in the offering. In a book-build process, co-managers and syndicate members of the offering, who plan to sell the securities (collectively, the "selling group") are given an allocation of priced shares that may or may not correspond to their retail network's aggregate demand. These priced securities are then allocated at the discretion of that specific underwriter (or, more rarely, on a "first-come first-serve" or lottery basis) to their individual retail clients. In the dutch auction securities offering process, the trade-off for a more democratic and fair process for the smaller investor is that the broker/dealer must allow his customer to be reviewed and qualified by another underwriter who may become a competitor for that very customer relationship. This creates concerns of privacy among underwriters, because one underwriter may not want to share the bid data and the qualifications of a list or particular investor. The one underwriter will not want the lead underwriter to be able to see the demographics or even possibly names and addresses of that underwriter's account base.

Price Discovery Via User Simulations to Attain a Collaborative Forecast

The Internet provides access to financial and news information. Applications such as eBay provide marketplaces where buyers and sellers converge to determine "fair" prices for products via the dynamics of many participants in the market. Currently there is no equivalent for transparently developing the fair price of financial securities to be issued in an underwritten offering.

Generally, the public cannot acquire objective research regarding the offered security until they have already purchased the security. Traditionally, investors in offerings base their decisions on the S-1 filings with the SEC. At a set time after the offering closes (the "quiet period"), research reports from financial analysts working for underwriting companies often become available to customers of those underwriters. While these analysts evaluate the financial performance, business plans, and competitive landscape of companies, because the formal research reports are not available until after the public offering and those research reports are written by firms that were compensated to complete the offering, this practice has raised concerns regarding the independence, objectivity and value of such research.

Investors can find copious amounts of general news and information related to an upcoming public securities transaction via websites like Yahoo!, Reuters, or Google. However, there is a dearth of public websites that provide indepth information and tools relevant to a detailed analysis of a transaction. One website called EconomicInvestor (www.c4*cast*.com), with a patented process (U.S. Pat. No. 6,606,615), provides Bayesian analyses of participant input on various predictions, including value of stocks indexes and individual stocks with recognition for winners. Such data is applied to study how assets and portfolios respond to key economic factors.

Specifically catering to IPOs there are broad based web sites such as IPO Financial Network, or IPOHome.com; temporary niche sites such as googleiposwami.com, goggle-ipo-.com; sites such as Iowa Electronic Markets which act like a derivative or futures market to establish a price for a security; or online offshore gaming sites such as tradesports.com which allow wagering on IPO outcomes. Finally price discovery logic has been applied solely for entertainment purposes to showcase a customer's stock trading (virtualstock-exchange.com), or successful movie picking (Hollywood Stock Exchange) prowess. Many of these sites have polls that enable participants to vote on what they believe the results of an upcoming event will be, create model portfolios and compare their portfolio's performance to that of other participants, or even place monetary bids based upon whether an offering will exceed a particular value. However, voting and online offshore gaming are less likely to produce useful information about interest level and pricing on an upcoming offering. Voting is not effective for a securities offering as small and large investors carry the same weight which can be misleading given the different bid sizes that occur in an offering versus the vote. Furthermore the polling sites generally allow users to vote for free. Lack of financial risk and strict dependence on user trustworthiness are significant weaknesses—there is no penalty for being wrong or misleading. Online offshore gaming does not provide transparency between institutional and individual investors, and is not legal in the U.S. Neither system is appropriate to provide the relevant feedback and analysis for a securities offering and likely provide inaccurate or suspicious results. Thus, participants may place irrational wagers such as, selecting volatile stock options or "voting" a very high or low value for an upcoming IPO, because there is no financial deterrent to a participant for placing wild guesses as to the securities pricing or post-IPO market performance given the "all-or-none" nature of those types of data collection systems. The absence of realistic participation rules means that participant behavior and, thus, the process results lack realism.

Applications such as Hollywood Stock Exchange or the Iowa Electronic Markets can provide some value, but most are structured as contracts that pay a certain amount if a price threshold of the event is reached and nothing otherwise. If participants utilize real money for these methods, these "markets" may provide information of more value. However, there is considerable information missing from the results produced in such systems. For example, it is not possible to differentiate between the demand curves for institutional investors and for retail investors. Each group may have substantially different risk-reward profiles and amounts of capital to invest. Also, such simulations do not offer simulation participants a full range of bid sizes. For example, Iowa Electronic Markets have an account limit of $500 invested per participant. Thus, there is no means for an institution to simulate the results of a $20 million bid in a large public offering. There is also question of whether a derivative market can legally exist to provide true futures contracts for IPOs—SEC rules prohibit a whole series of so-called "when-issued" gray markets, as well as restrict the ability to borrow/rehypothecate stock, or short an IPO before the end of the quiet period which is approximately 25 days after the IPO.

BRIEF SUMMARY OF THE INVENTION

A computer implemented method is provided for determining a simulated price and other market information corresponding to real-world securities in an offering based on the concept of collaborative forecasting. The method comprises selecting a real world securities offering for a simulation auction and providing information about the selected offering to stimulate simulated bids for simulated securities corresponding to the selected offering; offering to accept simulated bids from one or more potential participants via a communication network for the simulation auction of securities, said offering requiring payment of a bid participation fee that increases with the total value of the securities for which the simulated bid is made; and receiving simulated bids via a communication network from paying participants. The method further involves determining a simulated clearing price for the securities in the simulation auction based upon the received simulated bids; and providing to participants making a bid feedback, or individual auction outcomes, indicating whether or not their bid was rejected and, if rejected, whether it was rejected as below the simulated clearing price determined in the simulation auction. The method also provides for further data exchange, after the actual offering of securities has been completed, with participants via the communication network to compare the collective forecast of the auction simulation with the actual outcome.

BRIEF DESCRIPTION OF THE DRAWINGS

FIG. 3 illustrates a screen shot of creating a new account on the auction management website in accordance with one embodiment of the present invention.

FIG. 5 illustrates a screen shot of placing a bid on the auction management website in accordance with one embodiment of the present invention.

DETAILED DESCRIPTION OF THE INVENTION

A. Invention Overview

Figure 1:
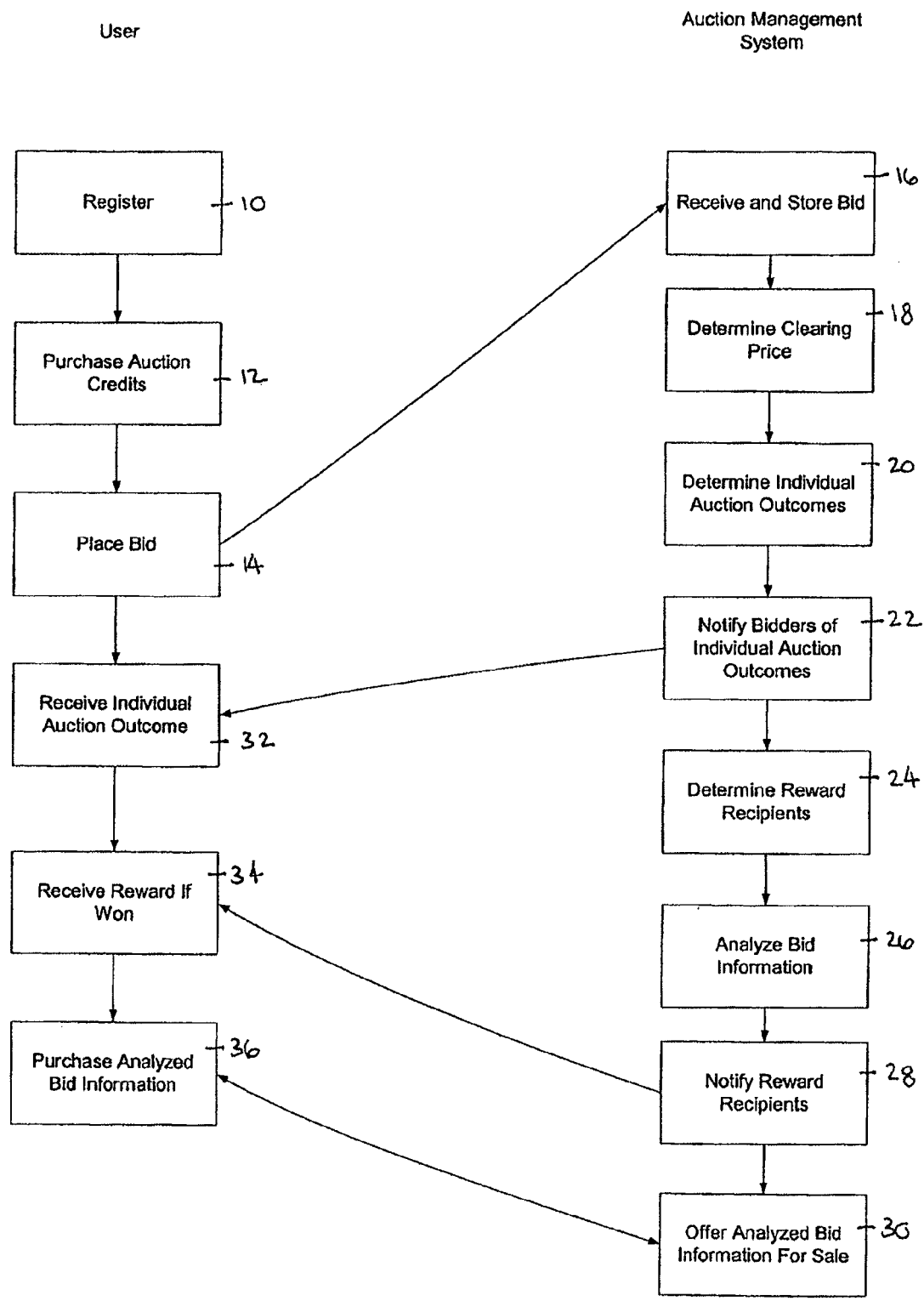
FIG. 1 is a block diagram of a simulation auction process in accordance with one embodiment of the present invention.

The invention provides a method and system for estimating demand, pricing, allocation and aftermarket demand for an actual, real-world public offering of securities via a simulation auction. The simulation auction incorporates features to encourage participant behavior that is close to behavior that would or will occur in the real-world offering. One feature is providing adequate information to enhance participant (or bidder) knowledge about a particular company and its proposed offering. The invention may also include features to select or encourage participants who will make useful bids, to discourage participants from making irrational bids, or to encourage future bids representative of real-world demand.

The simulation auction may be used to collect information regarding likely or equilibrium pricing of actual securities offerings, as well as to generate demand curve profiles for different types of participants (e.g., retail and institutional investors, small lot purchasers and larger lot purchasers). The auction or pricing discovery mechanism collects and aggregates information across the investment community, leveraging the connectivity and real time nature of the Internet to provide value-added feedback to participants. They can receive this information in advance of a real offering. Dissemination of the information from the simulation can enhance transparency and efficiency of the capital markets with more rapid and accurate modeling of the real-world price discovery process.

The invention provides a simulation auction for a public offering of securities that may be used for any suitable type of real public offering. Participants in the simulation auction provide information on how they value the security and how much they would consider purchasing at such a price. The simulation auction determines a simulated clearing price. This clearing price, along with one or more demand curves (for example, aggregate or separate retail and institutional participants), provides information on the likely demand for and value of the stock. This information may be used by simulation auction participants in their decision of whether to, and how to, participate in a real-world offering, whether that offering is via a dutch auction process or via a book-build process. After the auction, participants have information at their disposal that is not currently available to them and that will allow more productive investment discussions with their financial advisor.

Thus, the invention offers a simulation auction based on a real-world offering using the power of online collaborative forecasting. The invention may offer a simulation auction corresponding to a real-world dutch auction public offering. Alternately, the invention may offer a simulation auction corresponding to a traditional, or book-build, public offering. Further, the auction process used in the simulation auction need not reflect that of the real-world offering. For example, the simulation auction may be a dutch auction even though the real-world auction is a traditional offering. Likewise, the simulation auction may implement more traditional offering principles even though the real-world auction is a dutch auction. While the invention is described in terms of book-build auctions and dutch auctions, the invention may use as its auction rule set any rules that will attract participants and develop useful demand curve information and may correspond to any suitable type of offering of securities.

Further, the invention may be used for simulating an offering of any type of security. This may include equity securities, debt, or any other financial vehicles used for investment purposes.

Using the present invention, a real-world auction process may be emulated. For example, if the real-world auction will use a "dutch auction" process, each bidder in the simulation may submit any number of bids at any price. Further, if the real-world offering, based on its registration statement, specified minimum and maximum shares for bids, the simulation auction will similarly include minimum and maximum shares eligible for simulation bid.

Using the present invention, asymmetric pricing knowledge traditionally held by one constituency such as the bookrunner of the transaction, poses less of a hurdle to efficient price discovery. The present invention helps aggregate similar information for its participants to that used by a bookrunner, mitigating some or all of the bookrunner's asymmetric advantage. Thus, a currently opaque process becomes a more transparent process where each participant may be able to obtain more information relevant to the forecast of potential initial and aftermarket demand for a given offering. This realtime feedback is missing from currently available underwriting processes, thus frequently resulting in dramatic last minute transaction changes to pricing or size of the offering, which can have a negative impact on the issuer, underwriter, or investor. The invention's ability to utilize collaborative forecasting to provide transparency on potential demand and pricing, and the ability to emulate bidding strategies in advance of the actual offering provides investors with important analytical, tactical and potential market sentiment feedback. Additionally, the invention's ability to emulate the issuer's and underwriters' actual intended process creates a "mock" or "practice" session allowing participants to gain knowledge and confidence in the basic offering process, which could later improve the actual offering's. efficiency. Finally the invention generally avoids the potential conflicts of interest inherent in the current underwriting price discovery and allocation system whereby the underwriter has a client on each side of the transaction (i.e. investor v. issuer). FIG. 1 illustrates a block diagram of the steps for a simulation auction in accordance with the present invention. The diagram assumes the simulation auction manager has already selected an offering to simulate, has provided a description of that offering and the simulation offering that corresponds to it. A participant registers, at block 10, purchases auction credits, at block 12, and uses a portion of or all of those credits to place at least one bid in an auction, at block 14. A bid includes the price the participant would pay per share of stock as well as an amount of stock. Thus, the bid is the product of the price and the amount. An auction management system receives and stores the bid, at block 16. After other bids for that auction are submitted and the auction simulation is completed, the auction management system determines the clearing price, at block 18, and the individual auction outcomes, i.e., the status of each bid, at block 20. At block 22, each participant is notified regarding the individual auction outcome for the participant's bids. The auction management system further analyzes bid information, at block 26. Additional participant profile (if available, e.g., demographics, investment goals, etc.) information may be used for market segmentation or other purposes. Analyzed bid information, or premium content, may be provided to selected participants, at block 28, as a reward or offered for purchase by a participant or others.

B. Simulation Auction System Overview

Figure 2:
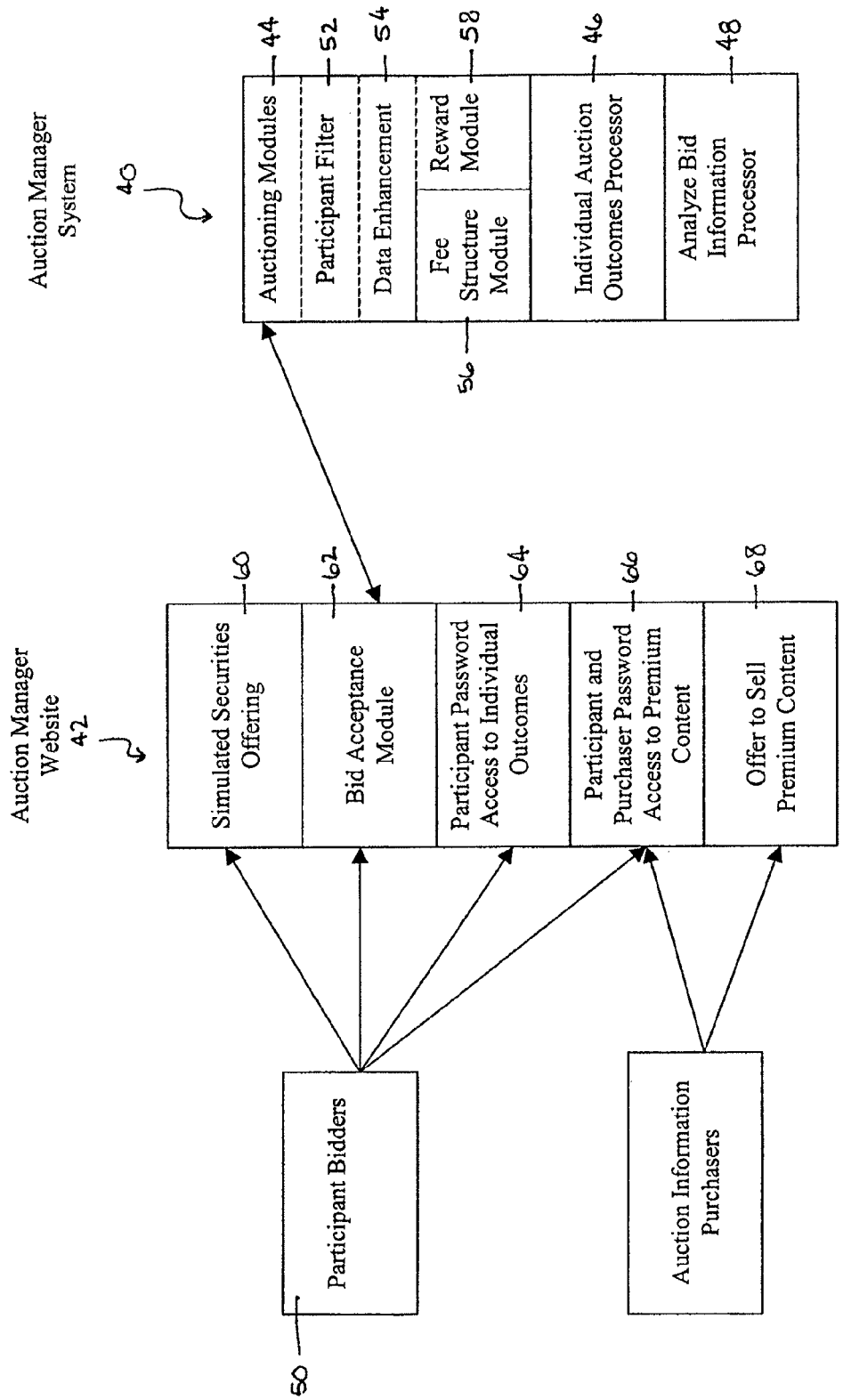
FIG. 2 is a block diagram of the interaction of bidders and/or purchasers with an auction manager website and auction manager system in accordance with one embodiment of the present invention.

As shown in FIG. 2, an auction management system 40 and an auction manager website 42 are provided for handling the multiple components and activities of the simulation auction. The auction management system 40 includes auctioning modules 44, an individual auction outcome processor 46, and an analyzed bid information processor 48. The auctioning modules 44 compile the information from bid participants 50, for example the bid price and units, for the various auctions. The auctioning modules 44 further include a participant filter 52 and data enhancing components 54 including a fee structure module 56 and a reward module 58. The participant filter 52 excludes persons who are recognized as not useful to the simulation. The data enhancing components 54 act at two points in time. First, the components 54, via the fee structure module 56, present a fee structure that shapes participant behavior toward the same bidding behavior as in a real-world securities purchase. Second, once auction outcomes are determined, the components 54, via the reward module 58, allocate information, participation credits or other value items to reward participants for placing bids that end up near the clearing price. When the bid submission closes, the individual auction outcomes processor 46 processes to find the final clearing price determined by the auction method stipulated and to determine the outcome for each bid. The analyzed bid information processor 48 further processes the bids placed to generate information such as a comprehensive distribution of bid sizes and prices, aggregate demand curves for both professional and non-professional investors (or other identifiable market segments), implied valuation multiples versus comparable companies at the clearing price, and other statistics relevant to understanding the mindset of other participants.

Access to the simulation auction is generally provided through the auction manager website 42. The auction manager website 42 includes the simulated securities offering 60, a bid acceptance module 62, participant password access to individual outcomes 64, participant and purchaser password access to premium content 66, and offers to sell premium content 68. The simulated securities offering 60 on the website 42 may include access to information regarding the real world securities offering, such as the prospectus, road show information, and research reports, in addition to the rules governing the simulation auction.

Participation in the simulation auction does not require extensive personal information from a user. Thus, users are not discouraged from participating due to privacy concerns. On the other hand, if additional profile information can be elicited that helps segment the market or further develop the demand curve, it can be requested and, in appropriate circumstances, required. For example, if two consecutive simulation auctions are staged for the same offering, one auction could be structured to request greater participant profile information than the other, with the recognition that this might change results in a revealing way.

The auction management system 40 uses a participant filter 52. The participant filter 52 excludes persons who are recognized as not useful to or possibly detrimental to the simulation. This may be done during registration based on information regarding the person. Alternately, this may be done during the auction based on bids placed.

One aspect of the participant filter is to try to identify participants who are trying to game the simulation auction to distort its outcomes. Another aspect of the filter is to identify persons whose participation makes the simulation outcomes suspect, even if the person does nothing to distort them. For filtering in one embodiment it is useful to sort non-professionals from others. For the purposes of the simulation auction, a non-professional investor is a natural person who is applying/acting in a personal capacity, and neither a principal, officer, partner, employee, nor agent of any business, also not acting on behalf of any other individual Further, a non-professional investor is a person who obtains information for his/her own investment purposes and not for any business purposes. A non-professional investor cannot be registered or qualified with: The Securities Exchange Commission (SEC) in any capacity; The Commodities Futures Trading Commission; any state securities agency; an securities exchange or association; any commodities or futures contract market or association. Furthermore, a non-professional investor can not be (a) an investment advisor; (b) a person employed by a bank, or other organization exempt from registration under federal and/or state securities laws, to perform functions that would require registration or qualification if such functions were performed for an organization not so exempt; or (c) a person engaged as a consultant, independent contractor, software developer, or other person that uses market information for any purpose for profit other than the trading of that person's own personal account(s). These requirement of a non-professional investor are guidelines for the purposes of gathering more accurate information regarding demand curves. They can be implemented by questions and warnings on the website. However, the preceding guidelines may be varied for different auctions.

To register to participate in a simulation auction, a user accesses the website 42 and creates a new account by entering user information online as at FIG. 3. This information includes a name 70 (in one embodiment, a pseudonym may be used), a valid e-mail 72 (for the purposes of receiving information regarding the auction), whether the user is a non-professional investor or a professional investor 74, and whether the participant (or an immediate family member thereof) is an employee of or affiliated with a NASD member 76. Also, users may be asked whether they are an employee or relative of an underwriter of the real-world offering or of the company that is offering securities for sale. Such users may be excluded from participation in that company's simulation auction due to potential conflicts of interest. The information gathered using the questions relating to NASD affiliation and underwriter or company affiliation may be used in the participant filter.

The auction management system 40 further uses a data enhancing components 54 to incentivize and reward participants for placing bids that end up near the clearing price. The data enhancing components 54 include a fee structure module 56 prior to bidding and a reward module 58 based on the results of the auction.

Figure 4:
FIG. 4 illustrates a screen shot of the auction management website prompting a user to purchase credits in accordance with one embodiment of the present invention.

To participate in the auction, the registered participant is prompted, at block 80, to purchase auction credits, as shown at FIG. 4. The participant purchases auction credits for placing a bid. The cost of the auction credits may be tied to the total amount the participant plans to bid. For example, in one fee structure the amount of credits and the corresponding underlying dollars to buy the credits may be as follows:

| Amount of Credits | Dollars to buy Credits |
|---|---|
| $10k | $10 |
| $100k | $50 |
| $1m | $200 |
| $10m | $500 |
| $100m | $2000 |

Of course, other pricing schemes for the credits may be used. By having the investors (or participants or bidders) have some stake in bidding accurately insofar as a payment may be required to make the bid and that payment may be tied to the total amount bid, such that as the amount bid increases, the payment increases. A non-linear increase (for example, as shown above) is useful in one embodiment, to help encourage bidding at higher amounts. Thus, the fee structure module may require bidders to have a stake in the auction that more accurately simulates reality, where bidders must pay more to bid more and have real'money invested in the position they take. The extent of the increase and the degree of non-linearity is selectable in the software and is communicated as part of the auction rules in one embodiment.

In one embodiment, some users may register and participate in the auction for free at some minimum level. For example, a non-paying user may place one bid for up to ten shares. Generally, such users are not given information about the outcome of the auction—for example, the clearing price. However, the registration information and bid may have sufficient utility to allow simulation participation and a basic bid outcome report.

After purchasing (or registering for) credits, the participant may place a bid, as shown at FIG. 5. The bid generally reflects the bidder's viewpoint on value of the securities and their investment capacity and needs. The participant places a bid by entering a bid amount 82 and a share or unit price 84. The participant filter 52 may filter participants based on the bids placed—either by excessive small bids or massive bids at either extreme of the bidding range. In one embodiment, the participant filter may include a rule structure to discourage submission of many small bids to find the edges, peaks, or valleys of the demand curve and triangulate a clearing price. A user who submits many small bids clutters the demand curves. This user may also be seeking to derive information made available only as premium content. Similarly, a massive bid at either extreme to "head-fake" the market or to walk the market up and down may be noticed and disqualified. Such a massive bid, if not disqualified, may dilute the results by swaying the outcome dramatically.

The auction process may use the participant filter 52 to filter out participants based on their bids. Thus, bids may be disqualified during the simulation. For example, if such bids would be considered speculative in the real-world auction, they may be disqualified during the simulation auction.

Returning to FIG. 1, at the end of the auction, the auction management system determines the clearing price, at block 18. One method for determining the clearing price is to sum up the bid quantities (the "rolling accumulation") starting from the bid with the highest price and working downward. At the bid price at which the rolling accumulation surpasses the quantity of securities being offered (the "aggregate securities"), the auction management system will establish such price as the price at which all participants whose bids are included in the rolling accumulation will be allocated shares (the "clearing price"). This pricing calculation may be done by a computer software algorithm. U.S. Pat. No. 6,629,082 describes one such algorithm. Other algorithms may be implemented in the auctioning modules, including one or more intended to embody book-build offering principles.

If the clearing price is determined on the basis of a book-build offering, the auction management system uses a set of rules emulating a real-world book-build offering to determine the clearing price. Thus, the auction management system may set what the maximum or desired percentage of institutional versus retail investors should be, what investors may be preferred (as having special interest in, knowledge of, or an ownership stake in the comparable or complementary industry sector), and what the appropriate discount could be based on comparables, general market conditions, specific transaction related documentation or restrictions demanded by the issuer. Further, the auction management system may consider the amount of over- or under-subscription in setting pricing and allocations. Thus, the auction management system may have a library of auction rules. It may present a simulation auction based on one set of rules and determine and report outcomes based only on that set. It may also apply to a simulation auction one or more sets of auction rules and determine and report auction outcomes based on one or more sets of auction rules. This may have utility where the auction/allocation process for the real-world offering has a discretionary element or some other not fully-revealed methodology and two different modeling methodologies may assist persons studying the real-world offering by triangulating between the outcomes provided by the different methodologies.

C. Distribution of Auction Outcomes

As shown in FIGS. 1 and 2, after the auction closes the auction manager system then determines the individual auction outcomes, at block 20. Each bidder receives, at block 32, an outcome report giving his/her/its individual auction outcome. In one embodiment, three possible outcomes are available for each bid: "considered speculative and rejected," "below clearing price and rejected," and "accepted." Thus, the invention allows a user to estimate the outcome of a public offering based upon bids by investors in a simulation auction, who may be actual bidders in the real-world auction. The outcome reports may be transmitted to each participant electronically, for example via e-mail. Alternately, or additionally, the reports may be made available on the website via password access, as at 64 of FIG. 2. Timely availability is important, as participants may be developing a strategy for a bid in a real-world offering that will soon open or close.

As noted, the participant filter 52 is intended to deter or exclude persons whose bid might lack utility or distort the auction outcome. However, the value of the information increases when the participating bids are of high utility. Thus the reward module 58 of the data enhancing components 54 utilizes several possible incentives to encourage bidders to bid accurately and in an amount in the stimulation that bears some relation to a bid they would pursue in the corresponding, real-world auction. Generally, the invention has a bid analysis structure with weighting that rewards bidders whose best bid was close to the clearing price and large in absolute terms. In the case of multiple bids by a participant, the relative size of the closest potential successful bid to other outlying bids placed by that participant may be reviewed.

One incentive reward may be tied to the credits used to place a bid. Depending on the proximity of the bid to the clearing price, some or all of the credits used in one auction or one bid may be carried to a further auction. The further auction may be a further auction round of the same auction or may be a new auction. Alternately, the further auction may be a further auction round until the final round of the auction, the credits then becoming transferable to a new auction. In one embodiment, the proximity required to carry credits depends on the bid amount. Alternately, the transferability of the credits may be tied to other criteria, such as other research tools. For example, if the bidder purchases a research report on the related public offering, the bidder can carry the credits to a further auction.

The following table illustrates example proximities based upon bid amounts:

| Bid Amount | Proximity Required |
|---|---|
| $10k | +/−$0.25/share |
| $100k | +/−$0.50/share |
| $1m | +/−$1/share |
| $10m | +/−$5/share |
| $100m | no proximity required. |

The proximity listed above permits a big investor with a less precise bid to be rewarded. More specifically, if a participant bids using $10,000 auction credits (which, in one embodiment, may be purchased for $10), they may have to be within 1% of the clearing price to maintain their auction credits for future use. In contrast, if the participant bids $100M auction credits (which they may have purchased for $2000), they can automatically carry their auction credits for future use no matter how far off their bid is from the simulation auction clearing price. This encourages larger investors, for example professional investors, to participate in the simulation as they would in the real-world offering.

Another possible incentive to bidders to provide well-considered bids, is to provide analyzed bid information, or a "Premium Content," report to selected bidders based on the relative value or utility of their bid in the simulation auction. With a given evaluation yardstick, the specified percentage of bidders that measures highest can be rewarded. As shown in FIGS. 1 and 2, the auction manager system analyzes and processes the bids placed to find the clearing price, at block 18, and to generate the premium content information, at block 26. This information may include the clearing price determined by the auction method stipulated, a comprehensive distribution of bid sizes and prices, aggregate demand curves for both professional and non-professional investors (or other identifiable segments of the participants), implied valuation multiples versus comparable at the clearing price, and other statistics relevant to understanding the bids and evaluation perspective of other participants. The Premium Content report may also be offered for sale, at block 30, to participants who were not provided it as a reward or to persons who are not participants but value the simulation outcome.

In one embodiment, the 25% of bidders closest (based on a weighted measure) to the clearing price may be rewarded with a free Premium Content report. In one embodiment, the following evaluation formula may be used to determine the top 25% of bidders (or winning bidders):

Confidence_Coefficient=(Size_Of_Your_Best_Bid/
Total_Of_All_Your_Bids)^2
Impact_Score=Confidence_Coefficient*
(Your_Best_Bid_Size+7000)/(abs(Your_Best_
Bid_Price-Clearing_Price)+0.00000001)

Thus, the utility determination is based generally on a weighting of two factors: the amount bid and the proximity of the bid to the clearing price. The exact weightings are adjustable and selectable in the software.

In lieu of a set percentage of bidders, in one embodiment bidders whose bid is within a certain range from the clearing price may be rewarded. This range may depend on the size of the bid. For example, the following relationship may exist between size of bid and bid precision in order to be rewarded:

| Size of Bid | Bid Precision |
| --- | --- |
| $1000 | $0.01 |
| $10000 | $0.02 |
| $100000 | $0.13 |
| $1000000 | $1.26 |
| $10000000 | $12.51 |

The ranges listed above permit a big investor with a less precise bid to be rewarded. This encourages big investors, for example professional investors, to participate in the simulation as they would in the real-world offering. Again, the exact threshold for selection is adjustable and selectable in the software.

Other incentives may be provided to stimulate participation in general. For example, any bidder who purchases at least $300 worth of credits for one company's offering may receive premium research content on that series of auctions corresponding to that company's real-world offering for no additional charge. A plurality of simulation auction rounds may be held before each real-world auction. Thus, bidders may input different prices or purchase amounts or use varying strategies in different auction rounds.

As stated above, a plurality of simulation rounds may be held for each real world auction. As people become interested in and educated about an offering, the market information regarding the offering will develop. Holding a plurality of simulation rounds provides information about the market as the market develops. Thus, each auction round may provide a different view of the market information and the bidders' mentality.

Feedback, such as the individual auction outcome, is provided to each bidder prior to the occurrence of the real auction being simulated by the invention. The outcome report may be transmitted to each bidder via email. Providing this timely outcome report allows a bidder to place a bid in the real auction with at least some knowledge of what the simulation auction showed demand to be. Greater amounts of demand curve information would be expected to have higher value to a simulation auction bidder who becomes a bidder in the real-world auction.

Further, after the real-world auction, the invention may provide after-market information to the bidder reflecting information from the simulation auction as well as information from the real-world auction. For example, if a bidder bid $27 during the simulation auction and the real-world auction brokered clearing price was $23, the invention may notify such a bidder using a market prompt reporting that the real-world clearing price was below their proposed bid in the simulation auction. Such a prompt allows the bidder to take the opportunity to bid at a value more favorable than one they had indicated as acceptable. As with auction outcomes, the prompt may be communicated by e-mail or provided at a website or by other electronic means.

D. Further Design Considerations

Figure 6:
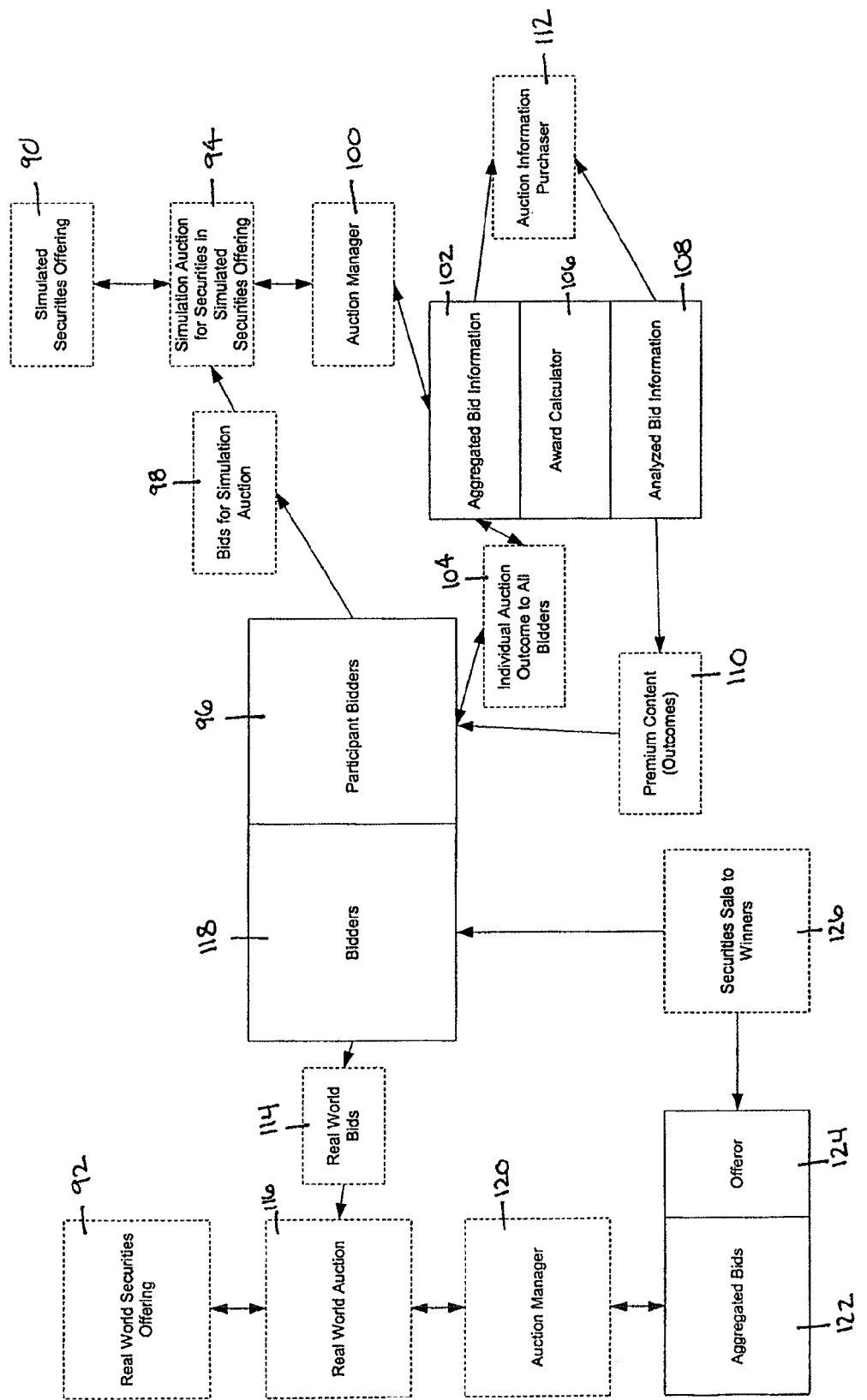
FIG. 6 illustrates a block diagram of the relationships between a simulated securities offering and a real world securities offering in accordance with one embodiment of the present invention.

FIG. 6 illustrates the relationship of a simulated securities offering 90 to a corresponding real world securities offering 92. In the simulated securities offering 90, a simulation auction 94 is held for a set of securities that is the same as or designed to be a representative sample of the real-world offering 92 that is the selected subject for the simulation. Participant bidders 96 place bids for the simulation auction 94 at block 98. An auction manager 100, using the auction management system, aggregates the bid information 102 and applies an allocation rule set to determine the individual auction outcome for each bidder 96. The individual auction outcome is then transmitted, at block 104, to each participant bidder 96. At block 106, the auction management system also determines which participant bidders 96 should receive additional outcome information 108 as a reward for participation in a way that adds utility to the simulation. This may involve a calculation of the utility of each bid to the statistical validity, accuracy or some realism measure of the simulation. It is expected that the weighing processes for rewarding certain types of bids and bidders will be refined by comparison of simulation results to actual auction results. Neural networks or other correlation tools may be used to develop the utility evaluation processes and implement rewards in the auction management system in such a way that participation of bidders that add validity to the simulation as a pricing and demand curve exploration tool is encouraged.

The auction management system further analyzes the bid information to develop premium content that is expected to be useful for the real-world bidding strategy of participant bidders 96 who are considering bids in the corresponding real-world offering 92. The analyzed bid information 105, or premium content, may be transmitted to those bidders receiving rewards, at block 110. The auction information, including aggregated bid information and analyzed bid information may also be offered for purchase, 112, although its value to participant bidders 96 is expected to make it important as an incentive to attract participants that contribute validity to the simulation.

The participant bidders 96 may use the information garnered from the simulation auction 94 to place real world bids 114 in a real world auction 116 of the real world securities offering 92. Thus, there may be an overlap between the participant bidders 92 in the simulated securities offering 90 and the bidders 118 in the real-world securities offering 92. In the real world securities offering 92, a real world auction 116 is held wherein bidders 118 submit real world bids 114. An auction manager 120 conducts the real-world offering auction 116 (including processes that may be rule oriented or that may involve discretion) and, ultimately, aggregates the bids, at block 122, according to the rules. The winning bids are determined and an offeror 124 sells the securities, at block 126, to the winners of the real-world auction 116. A goal of the invention is to provide a simulated bidding situation in which the participants can make a bid (or bids) and will receive a reported outcome that will accurately predict the result if they make that same bid in the real world offering. The premium information helps a participant decide how to adjust a bid so as to achieve a desired purchase objective, which may be the same as or different from the objective of the bid on which they receive a direct outcome report. If enough realism can be achieved in the simulation auction, the resulting demand curve information will permit a recipient of that information to make an educated bid, better calculated to optimize investment objectives.

Fundamentally, the present invention provides a simulation for a securities offering that combines the following features:
1. Validity and data enhancing features, including participant filters to filter out bidders and bids that are viewed as distorting the simulation, including a bid fee structure that increases with the total value of the bid made, and rewards to incentivize participants to provide bids of the kind that add validity and accuracy to the outcome of the simulation
2. Flexible auction structures for bid processing, including providing one or more sets of auction rules, which can be selected in a given simulation to track the structure of a securities offering auction that is the subject of simulation, to appeal to participants or to provide a particular view of the demand curve(s) that is derived from the simulations bids.
3. Development of additional market information going beyond individual bid outcomes, to provide valuable demand curve information usable either as an incentive to encourage bids that have greater value or as salable market research information to persons who are considering bids in the securities offering auction that is the subject of simulation.
4. Distribution of the individual bid outcomes and/or the additional market information to all participants, selected participants who have earned rewards or purchasers who value the data available from a simulation.

E. Implementation

The invention may be implemented on two dual processor Intel Pentium 4 servers, each with 1 gigabyte of memory using Microsoft Windows 2003, Internet Information Server (IIS), .NET, and SQL 2003, and customized software that provides the auction management features discussed above. The database is preferably capable of storing and processing millions of records per simulation auction as each participant may have multiple bids.

The system may be designed to integrate with a shopping cart system and a secure credit card processing system such as PayPal.

Because confidential user demographic and bid data is stored in the SQL Server, this server may operate behind a firewall such that the only access permitted to the SQL Server via the Internet is pre-defined, specific SQL stored procedure calls from the "front end" Web Server that is accessed by users over the Internet.

Further, the simulation auction system may be designed as a high availability implementation by operating multiple systems for each of the SQL server and the Web server. These can be run in a load-balanced configuration at multiple data centers.

Attached as Appendix A is some SQL code that was developed to determine the clearing price of a simulation auction.

Although the invention has been described with reference to preferred embodiments, persons skilled in the art will recognize that changes may be made in form and detail without departing from the spirit and scope of the invention.

What is claimed is:

1. A computer implemented method for collaborative development before occurrence of a real-world securities offering of price forecasting information to guide bidders in the real-world securities offering, comprising:

configuring in an auction manager data processing system a simulation auction based on the real world securities offering, including selecting a set of auction rules for determining auction outcomes from simulation bids for simulated securities corresponding to the real world securities offering;

offering participation in the simulation auction by providing information on the real world securities offering and about receiving simulation bids from simulation participants, each simulation bid stating a per share price a simulation participant would pay for securities in the corresponding real world securities offering and the number of shares the simulation participant would purchase at such price, with multiplication of number of shares and share price defining a total simulation bid amount;

receiving via a communication network a plurality of simulation bids submitted by simulation participants and requiring for simulation bids payment of a participation fee that is a fraction on the order of one-five-thousandth of the total simulation bid amount;

compiling the received simulation bids prior to occurrence of the real world securities offering;

before occurrence of the real world securities offering, applying in a computer processor the selected set of auction rules to the compiled simulation bids, to compute a simulated clearing price for the simulated securities in the simulation auction;

providing to simulation participants price forecasting information before occurrence of the real world securities offering, said information selected from the group consisting of: (a) an individual auction outcome indicating whether a simulation participant's simulation bid was rejected or not and, if rejected, whether it was rejected as below the simulated clearing price determined in the simulation auction, and (b) the simulated clearing price; and accepting a portion of the simulation participants to participate with a simulation bid of a minimum total simulation bid amount and receive auction outcome information or a simulation bid credit only when such simulation bid and accompanying participant registration information have sufficient relative collaborative forecasting utility as determined by a rewards module that evaluates simulation bids at least in part by proximity to the simulated clearing price.

2. The computer implemented method of claim 1 further comprising applying a participant filter to simulation bids and participant registration information received to filter out potential simulation participants or simulation bids that are detrimental to the simulation auction, said filter applying exclusion criteria selected from the group consisting of:

simulation bids or simulation participants that are manipulative, simulation participants viewed as having a conflict of interest, simulation participants trying to game the simulation auction to distort its outcomes, and simulation participants using multiple bids trying to triangulate a clearing price.

3. The computer implemented method of claim 1 further comprising applying a participant filter to simulation bids received to filter non-professional investors from other simulation participants.

4. The computer implemented method of claim 1 further comprising applying a participant fee structure to simulation bids received that decreases the fraction of the total simulation bid amount required as a participation fee with an increase in the total simulation bid amount.

5. The computer implemented method of claim 1 wherein the step of applying a set of auction rules comprises selecting from a library of auction methods one method and applying it to the simulation bids received.

6. The computer implemented method of claim 1 wherein the step of applying a set of auction rules comprises selecting from a library of auction methods one method that tracks an auction method to be used in the real world securities offering and applying it to the simulation bids received.

7. The computer implemented method of claim 1 wherein the step of applying a set of auction rules comprises selecting from a library of auction methods more than one auction method and applying each method to the simulation bids received to develop and report auction outcomes from simulation bids for each of the more than one auction methods.

8. The computer implemented method of claim 1 further comprising executing a rewards module that evaluates simulation bids and selects certain simulation bids with greater proximity to the simulated clearing price or greater total simulation bid amount as having earned a reward comprising analyzed bid information developed from received simulation bids or credits usable for participation fees.

9. The computer implemented method of claim 1 further comprising executing a rewards module that evaluates simulation bids based in part on proximity to the simulated clearing price and also based on the total simulation bid amount and selects certain simulation bids with greater proximity to the simulated clearing price or greater total simulation bid amount as having earned a reward comprising collaborative price forecasting information developed as a premium content report derived from received simulation bids and not supplied to all simulation participants or credits usable for participation fees.

10. The computer implemented method of claim 9 wherein the premium content report derived from the simulation auction comprises at least one of a demand curve for simulation participants that are professional investors, a demand curve for simulation participants that are non-professional investors, a demand curve for all simulation participants, and a distribution of bid sizes and share prices.

11. The computer implemented method of claim 1 further comprising executing a rewards module that evaluates simulation bids based in part on proximity to the simulated clearing price and also based on the total simulation bid amount and selects certain simulated bids with greater proximity or greater total simulation bid amount as having earned a right to participate in another simulation auction based on a credit from a prior participation fee.

12. The computer implemented method of claim 1 further comprising executing a rewards module that evaluates simulation bids to reward those with greater proximity to the simulated clearing price and with greater total simulation bid amount, selects for rewards certain simulation bids based on weighting of these factors that is adjustable in software, and provides for the selected bids a reward comprising collaborative price forecasting information or credits usable for participation fees.

13. The computer implemented method of claim 1 further comprising comparing a simulation participant's simulation bid per share price to a clearing price of a security in the real world securities offering and providing a purchase prompt after occurrence of the real world offering to at least one simulation participant who provided a simulation bid that exceeds the clearing price in the real world securities offering.

14. A tangible non-transitory computer readable medium containing a computer program for collaborative development before occurrence of a real-world securities offering of price forecasting information to guide bidders in the real-world securities offering, the computer program comprising:
a code component configured to perform a simulation auction corresponding to the real world securities offering, including a set of auction rules for determining auction outcomes from simulation bids for simulated securities corresponding to the real world securities offering;
a code component for providing information about the real world securities offering and receiving simulation bids from simulation participants, each simulation bid stating a per share price a simulation participant would pay for securities in the corresponding real world securities offering and the number of shares the simulation participant would purchase at such price, with multiplication of number of shares and share price defining a total simulation bid amount;
a code component for receiving via a communication network simulation bids from simulation participants prior to occurrence of the real world securities offering and requiring for simulation bids payment of a participation fee that is a fraction on the order of one-five-thousandth of the total simulation bid amount;
a code component for applying the set of auction rules to the received simulation bids, to transform the received simulation bids into a simulated clearing price for the simulated securities in the simulation auction;
a code component for providing to simulation participants price forecasting information in advance of the real world securities offering, said information selected from the group consisting of: (a) an individual auction outcome indicating whether a simulation participant's simulation bid was rejected or not and, if rejected, whether it was rejected as below the simulated clearing price determined in the simulation auction, and (b) the simulated clearing price; and
a code component for accepting a portion of the simulation participants to participate with a simulation bid of a minimum total simulation bid amount and receive auction outcome information or a simulation bid credit only when such simulation bid and accompanying participant registration information have sufficient relative collaborative forecasting utility as determined by a rewards module that evaluates simulation bids at least in part by proximity to the simulated clearing price.

15. The computer readable medium of claim 14 further comprising:
a code component for determining simulation bids with greater proximity to the simulated clearing price or greater total simulation bid amount as indicators of the relative collaborative forecasting utility of simulation bids submitted by simulation participants in the simulation auction; and a code component for providing to selected simulation participants who provide simulation bids with greater relative collaborative forecasting utility greater information determined in the simulation auction than other simulation participants.

16. The computer readable medium of claim 14 further comprising a code component with a filter applying participation exclusion criteria selected from the group consisting of:
simulation bids or simulation participants that are manipulative, simulation participants viewed as having a conflict of interest, simulation participants trying to game the simulation auction to distort its outcomes, and simulation participants using multiple bids trying to triangulate a clearing price.

17. A computer implemented system for developing before occurrence of a real world securities offering securities price forecasting information useful to bidders in the real-world securities offering, comprising:
at least one data processor communicating with a communication network accessible to persons interested in the real-world securities offering;
a code component executing on the at least one data processor configured with auction rules to perform a simulation auction for securities corresponding to the real world securities offering to determine a simulated clearing price and other market information for participants in the simulation auction;
a code component executing on the at least one data processor for providing information about the real world securities offering and about receiving simulation bids from one or more simulation participants via the communication network, each simulation bid stating a per share price a simulation participant would pay for securities in the corresponding real world securities offering and the number of shares the simulation participant would purchase at such price, with multiplication of number and share price defining a total simulation bid amount;
a code component executing on the at least one data processor for receiving simulation bids via the communication network and requiring for simulation bids a participation fee that is a fraction on the order of one-five-thousandth of the total simulation bid amount;
a code component executing on the at least one data processor for applying the set of auction rules to the received simulation bids, to transform the received simulation bids into a simulated clearing price for the simulated securities in the simulation auction that forecasts the clearing price in the real-world securities offering;
a code component executing on the at least one data processor for providing to simulation participants price forecasting information in advance of the real world securities offering, said information selected from the group consisting of: (a) an individual auction outcome indicating whether a simulation participant's simulation bid was rejected or not and, if rejected, whether it was rejected as below the simulated clearing price determined in the simulation auction, and (b) the simulated clearing price; and
a code component executing on the at least one data processor for accepting a portion of the simulation participants to participate with a simulation bid of a minimum total simulation bid amount and receive auction outcome information or a simulation bid credit only when such simulation bid and accompanying participant registration information have sufficient relative collaborative forecasting utility as determined by a rewards module that evaluates simulation bids at least in part by proximity to the simulated clearing price.

18. The system of claim 17 further comprising:
a code component for determining simulation bids with greater proximity to the simulated auction clearing price or greater total simulation bid amount as indicators of the relative collaborative forecasting utility of simulation bids submitted by simulation participants in the simulation auction; and
a code component for providing to selected simulation participants who provide simulation bids with greater relative collaborative forecasting utility, greater information determined in the simulation auction.

19. The computer system of claim 17 further comprising a code component with a filter applying participation exclusion criteria selected from the group consisting of: simulation bids or simulation participants that are manipulative, simulation participants viewed as having a conflict of interest, simulation participants trying to game the simulation auction to distort its outcomes, and simulation participants using multiple bids trying to triangulate a clearing price.

20. A computer implemented system for developing a collaborative price forecast useful to bidders in an identified, real-world investment offering, comprising:
at least one data processor communicating with a communication network accessible to persons interested in the real-world investment offering;
a code component executing on the at least one data processor configured with auction rules to perform a simulation auction corresponding to the real-world investment offering to determine a simulated clearing price and other market information for participants in the simulation auction and for providing information about and identifying the real world investment offering corresponding to the simulation auction and about receiving simulation bids in the simulation auction for a simulated investment corresponding to the identified real-world investment offering;
a code component executing on the at least one data processor for offering to accept simulation bids from simulation participants via the communication network, said offering requiring a simulation bid to state the total amount of the simulated investment for which the simulation bid is made;
a code component executing on the at least one data processor for receiving simulation bids via the communication network and requiring for simulation bids payment of a participation fee on the order of one-five-thousandth of the total amount of the simulated investment;
a code component executing on the at least one data processor for applying the set of auction rules to the received simulation bids, to transform the received simulation bids into a simulated clearing price for the simulated investment in the simulation auction that forecasts the clearing price in the identified offering;
a code component executing on the at least one data processor for providing to simulation participants price forecasting information before sale of the real world investment offering, said information selected from the group consisting of: (a) an individual auction outcome indicating whether a simulation participant's simulation bid was rejected or not and, if rejected, whether it was rejected as below the simulated clearing price determined in the simulation auction, and (b) the simulated clearing price; and a code component executing on the at least one data processor for accepting a portion of the simulation participants to participate with a simulation bid of a minimum total simulation bid amount and receive auction outcome information or a simulation bid credit only when such simulation bid and accompanying participant registration information have sufficient relative collaborative forecasting utility as determined by a rewards module that evaluates simulation bids at least in part by proximity to the simulated clearing price.

* * * * *